(12) United States Patent
Baughman et al.

(10) Patent No.: US 10,212,123 B2
(45) Date of Patent: Feb. 19, 2019

(54) TRUSTWORTHINESS-VERIFYING DNS SERVER FOR NAME RESOLUTION

(71) Applicant: International Business Machines Corporation, Armonk, NY (US)

(72) Inventors: Aaron K. Baughman, Silver Spring, MD (US); Mauro Marzorati, Lutz, FL (US); Gregory A. Porpora, New fairfield, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 318 days.

(21) Appl. No.: 14/950,312

(22) Filed: Nov. 24, 2015

(65) Prior Publication Data

US 2017/0149730 A1    May 25, 2017

(51) Int. Cl.
*H04L 29/12* (2006.01)

(52) U.S. Cl.
CPC ................ *H04L 61/1511* (2013.01)

(58) Field of Classification Search
CPC ............ H04L 61/1511; H04L 63/1483; H04L 63/1433; H04L 29/12066; H04L 29/12132; H04L 61/1552; G06F 21/85
See application file for complete search history.

(56) References Cited

U.S. PATENT DOCUMENTS

| | | | |
|---|---|---|---|
| 7,849,502 B1 * | 12/2010 | Bloch | H04L 29/12066 726/11 |
| 8,117,339 B2 | 2/2012 | Adelman et al. | |
| 8,521,667 B2 | 8/2013 | Zhu et al. | |
| 8,631,489 B2 | 1/2014 | Antonakakis et al. | |
| 8,762,573 B2 | 6/2014 | Robinson | |
| 8,966,625 B1 | 2/2015 | Zuk et al. | |
| 8,990,933 B1 * | 3/2015 | Magdalin | H04L 63/1483 709/229 |
| 2005/0144323 A1 * | 6/2005 | Gardos | H04L 29/12594 709/245 |
| 2005/0262248 A1 * | 11/2005 | Jennings, III | H04L 29/12066 709/228 |

(Continued)

FOREIGN PATENT DOCUMENTS

WO    2007087556 A2    8/2007

*Primary Examiner* — Daniel C. Murray
*Assistant Examiner* — Kristoffer L S Sayoc
(74) *Attorney, Agent, or Firm* — Garg Law Firm, PLLC; Rakesh Garg; William Hartwell (57) ABSTRACT

A request is received at a local domain name system server (LDNS) from a client application to resolve a domain name. Responsive to the request a WHOIS information corresponding to the domain name is obtained, using which an age of registration of the domain name and a first weighted value based on the age are computed at the LDNS. A host associated with the domain name is accessed to determine whether a type of a service is configured at the host. A second weighted value is computed based on the configuration of the type of the service. A weighted score is computed using the first weighted value and the second weighted value. An action is selected according to the weighted score. The action is applied to a network component in a network where the client application is executing, to control a manner in which the client application communicates with the host.

14 Claims, 6 Drawing Sheets

(56) References Cited

U.S. PATENT DOCUMENTS

2011/0208720 A1* 8/2011 Nicks ................ G06Q 30/00
                                                        707/723
2012/0042381 A1   2/2012 Antonakakis
2012/0303808 A1  11/2012 Xie
2013/0212240 A1   8/2013 Thornewell et al.
2016/0381056 A1* 12/2016 Floering ............ G06F 21/51
                                                         726/23

* cited by examiner

TRUSTWORTHINESS-VERIFYING DNS SERVER FOR NAME RESOLUTION

TECHNICAL FIELD

The present invention relates generally to a method, system, and computer program product for configuring and operating a Domain Name System (DNS) server. More particularly, the present invention relates to a method, system, and computer program product for trustworthiness-verifying DNS server for name resolution.

BACKGROUND

The Internet maintains two principal namespaces, the domain name hierarchy and the Internet Protocol (IP) address space. The DNS maintains the domain name hierarchy and provides translation services between the domain name hierarchy and the IP address space.

A host is any computer, service, or resource connected to the Internet or a private data network. A domain name is a textual string, which uses words or phrases from a language such that a human can memorize the string as a name of the host. The DNS not only translates a human-memorizable domain name to a computer-usable numerical IP address, but also associates various other information with the domain name as a DNS record of the corresponding host.

The DNS distributes the responsibility of assigning domain names and mapping those names to IP addresses by designating Authoritative Domain Name Servers (ADNS) for each domain. An ADNS is responsible for the definite and authoritative information—the DNS records—for those domain names that are configured on that ADNS by an administrator.

The Domain Name System also defines the DNS protocol, a detailed specification of the data structures and data communication exchanges used in DNS, as part of the Internet Protocol Suite. A DNS server is a server system or application that stores the DNS records for a set of domain names. A DNS server can be local to a data network, such as a local area network of a corporation or another entity.

A client application can request to resolve a domain name to an IP address by sending a name resolution request to a local DNS server (LDNS). If the LDNS has an entry for the requested domain name in the LDNS' database, the LDNS responds with an answer to the request from that database. If the LDNS does not have an entry for the requested domain name in the LDNS' database, the LDNS queries the ADNS for that domain and communicates the answer received from the ADNS.

Regardless of where the information to resolve the requested name to the IP address comes from, a DNS server always responds to a name resolution request truthfully based on the contents of that information. In other words, regardless of where the resolved domain name might direct the client application, the DNS server always provides the exact IP address that corresponds to the domain name in local or obtained information.

SUMMARY

The illustrative embodiments provide a method, system, and computer program product. An embodiment includes a method that obtains, responsive to receiving at a local domain name system server (LDNS) a request from a client application to resolve a domain name, a WHOIS information corresponding to the domain name. The embodiment computes, based on the WHOIS information, using a processor at the LDNS, an age of registration of the domain name. The embodiment computes a first weighted value based on the age. The embodiment accesses, a host associated with the domain name to determine whether a type of a service is configured at the host. The embodiment computes a second weighted value based on the configuration of the type of the service. The embodiment computes a weighted score using the first weighted value and the second weighted value. The embodiment selects an action according to the weighted score. The embodiment applies the action to a network component in a network where the client application is executing, the applying configuring the network component to control a manner in which the client application communicates with the host.

An embodiment includes a computer program product. The computer program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that not all hosts are benign. Many hosts deliver malicious data, collect data maliciously, or otherwise cause malicious data communications when contacted. For example, if a client application successfully resolves a domain name to an IP address such a host, the host could cause harm to the system or network where the client application is executing.

Presently, DNS servers have only static manual tools by which to blacklist certain domain names. When an administrator or a user adds a domain name to a blacklist or a hosts file (collectively referred to as "blacklist"), name resolution requests for resolving that domain name can be denied by the DNS server or redirected to a preconfigured location, a warning page, or something similar. For example, corporations use this technique to configure their LDNS for preventing access from within their intranet to certain domain names that are known to serve undesirable content or malicious communications.

DNS servers can share the blacklists or other similarly purposed configurations. Some services provide similar information to DNS servers upon a query.

The illustrative embodiments recognize that presently, a DNS server cannot evaluate a consequence of a requested name resolution and change a subsequent operation of the DNS server, the network, or the client application based on that evaluation. For example, presently, whether a DNS server obtains the correct IP address corresponding to a domain name from an ADNS of the domain name or an alternate IP address from a blacklist-type configuration, a DNS server has to respond to a request to resolve that domain name with that address. In other words, presently, if the name resolves to an IP address of a malicious host, unless that name has been preconfigured on a blacklist, the DNS server will provide the IP address of the malicious host to the requesting client application, and harm will ensue.

Presently, name changing technology exists, which is used by malicious coders to cause the domain names to change rapidly. The changing domain names map to an IP address for a very short time, e.g., a few seconds, and then the name changes, and the old mapping vanishes. Such technology defeats the blacklist methods for preventing name resolution to the malicious IP addresses.

The illustrative embodiments recognize that a DNS server should be able to evaluate the risks associated with a host at an IP address once a name has been resolved to that IP address. The illustrative embodiments recognize that to thwart name changing technology and other similarly purposed techniques, such evaluation cannot be static or manual such as a blacklist, but has to be computed in real-time based on a variety of factors.

The illustrative embodiments further recognize that based upon the outcome of the evaluation, a DNS server should be able to take different actions, cause different operations at the client application, the network where the client application is executing, in another system, or a combination thereof.

The illustrative embodiments used to describe the invention generally address and solve the above-described problems and other problems related to the operation of DNS servers in a data processing environment.

An embodiment can be implemented as a software application. The application implementing an embodiment can be configured as a modification of a DNS server, as a separate application that operates in conjunction with an existing DNS server, a standalone application, or some combination thereof.

An embodiment detects that a client application has requested name resolution of a domain name. The embodiment causes the DNS record of the domain name to be obtained from the ADNS responsible for the domain name. The embodiment analyzes the record received from the ADNS to determine a degree of completeness of the record. For example, the DNS record of a domain name can include several parts or categories of information—each called a record—such as Start of Authority (SOA) record, Mail Exchanger (MX) record, Name Server (NS) record, Text (TXT) record, and many others.

According to one embodiment, the more complete the DNS record corresponding to the domain name, the more trustworthy is the host of the domain name. Different degrees of completeness of the DNS record thus corresponds to different degrees or levels of trustworthiness in such an embodiment.

Furthermore, even when the embodiment has determined the degree of trustworthiness, e.g., on a scale of trustworthiness, based on the degree of completeness of the DNS record, an embodiment further associates a weight with that degree of trustworthiness. For example, in one case, the degree of completeness of the DNS record may be of the highest importance in determining the host's trustworthiness. Accordingly, the embodiment assigns the highest weight from a range of weights to the degree of trustworthiness derived from the degree of completeness of the DNS record.

The scale of trustworthiness may be normalized to other scales described herein for consistency of the measurements performed by the various embodiments. The range of weights may be common across all weights assigned as described herein, or may be normalized across the different weight assignments for consistency.

Another embodiment queries and obtains the WHOIS data about the domain. WHOIS data refers to the information that registrants provide and registrars make available through the WHOIS service. WHOIS data includes the name, names of the primary nameserver and secondary nameserver(s) for the domain name, the identity of registrar, the original creation and expiration dates of the registration, the name and postal address of the registered name holder, the name, postal address, e-mail address, voice telephone number and (where available) fax number of the technical and administrative contacts for the registered name.

The embodiment analyzes the WHOIS data to determine an age of the domain registration. Recall that name changing technology allows domain names to be created and remain in existence for very short periods of time, such as a few seconds, and is often misused by malicious users. Legitimate and benign domain names are created for longevity and often remain in existence for considerably longer periods, such as for years.

Thus, age of the domain registration, which the embodiment determines using the WHOIS information can be another indicator of the trustworthiness of the host associated with the domain name. According to one embodiment, the higher the age of the domain registration, the more trustworthy is the host of the domain name. Different ages thus correspond to different degrees of trustworthiness in such an embodiment.

Furthermore, even when the embodiment has determined a second degree of trustworthiness, e.g., on a scale of trustworthiness, based on the age of domain registration, an embodiment further associates a weight with such second degree of trustworthiness. For example, in one case, the age of the registration may be of the highest importance in determining the host's trustworthiness. Accordingly, the embodiment assigns the highest weight from a range of weights to the second degree of trustworthiness derived from the age of the domain registration.

In one embodiment, the second degree of trustworthiness depends on additional information in the WHOIS data. For example, the WHOIS data may show that the registrant has a name that is a known alias of an undesirable group or individual. Similarly, an address of a contact may be identifiably fictitious or verified as non-existent or incorrect. Many other suspicious, undesirable, deceitful, or incorrect information (collectively and interchangeably referred to hereinafter as "flagged" information) may be present in WHOIS data.

The embodiment uses the age of the registration, flagged information, or both, from the WHOIS data to determine the second degree of trustworthiness. In one case, the flagged information may establish a separate degree of trustworthiness distinct from the second degree of trustworthiness based on the age. In another case, the flagged information and the age of registration both contribute to the second degree of trustworthiness according to a suitably configured logic.

Another embodiment queries and obtains additional non-DNS data about the domain. Some non-limiting examples of non-DNS data include but are not limited to reputation data from a database of reputation or provenance information, current of previous blacklisting information, information available on social media about a domain name or a portion of its WHOIS information, and the like.

The embodiment analyzes the non-DNS data to determine a level of reputation of the domain name. The embodiment uses the level of reputation to determine another indicator of the trustworthiness of the host associated with the domain name. According to one embodiment, the higher the level of a domain's reputation, the more trustworthy is the host of the domain name. Different levels of reputation thus correspond to different degrees of trustworthiness in such an embodiment.

Furthermore, even when the embodiment has determined a third degree of trustworthiness, e.g., on a scale of trustworthiness, based on the level of the domain's reputation, an embodiment further associates a weight with such third degree of trustworthiness. For example, in one case, the reputation information may be of the highest importance in determining the host's trustworthiness. Accordingly, the embodiment assigns the highest weight from a range of weights to the third degree of trustworthiness derived from the level of reputation of the domain name.

Another embodiment contacts the host at the resolved address and obtains information about a set of information and services (collectively and interchangeably referred to hereinafter as "services") available at the host. For example, the embodiment determines whether the host can communicate using Secure Sockets Layer (SSL), whether a certificate associated with the SSL port or other secure port passes a trust test, whether the host has non-standard ports configured for common data communications, whether the host provides a contact address for reporting issues, whether the host has at least one webpage configured for display on the browser, whether copyright or other legal notices are present on the webpage, and many other such services at the host.

The embodiment analyzes the set of services to determine a level of veracity that can be attributed to the host. The embodiment uses the level of veracity to determine another indicator of the trustworthiness of the host associated with the domain name. According to one embodiment, the higher the level of a host's veracity, the more trustworthy is the host of the domain name. Different levels of veracity thus correspond to different degrees of trustworthiness in such an embodiment.

Furthermore, even when the embodiment has determined a fourth degree of trustworthiness, e.g., on a scale of trustworthiness, based on the level of the host's veracity, an embodiment further associates a weight with such fourth degree of trustworthiness. For example, in one case, the veracity may be of the highest importance in determining the host's trustworthiness. Accordingly, the embodiment assigns the highest weight from a range of weights to the fourth degree of trustworthiness derived from the level of veracity of the host.

An embodiment combines the weighted levels of trustworthiness to compute a weighted score of the address to which the requested domain name resolves. In one embodiment, the weighted score is a sum of all weighted levels of trustworthiness. In another embodiment, the weighted score is a normalized average of all weighted levels of trustworthiness. Generally, the weighted score can be computed using all or some of the several weighted levels of trustworthiness according to any logic or formula suitable for an implementation.

In a deterministic method for selecting an action at the DNS server, the client application, or at another system in the network, the embodiment compares the weighted score to a threshold. Any number of thresholds can be configured to created categories of actions. For example, a single threshold creates two categories—one when the weighted score reaches up to the threshold and the other when the weighted score exceeds the threshold. Similarly, two thresholds (A & B) create three categories—up to A, exceeding A and up to B, and exceeding B. Similarly, n thresholds can create n+1 or more categories for grouping the actions.

In the deterministic method, the embodiment determines the category of actions which corresponds to the weighted score. The embodiment performs one or more actions from the category, or causes such actions to be performed through other systems.

As a non-limiting example, assume that the weighted score categorizes a resolved address as good, neither good nor bad, and bad. For the "good" category, the embodiment instructs a firewall to allow the client application to connect with the resolved address as the client may need. The embodiment may cause the client's traffic to the host to route through a transparent proxy server, and perhaps with a long Time to Live (TTL). TTL is a period for which a name resolution remains valid after which a new name resolution request has to be sent to resolve the domain name again. A transparent proxy server is a proxy server configured to allow the communication without any specific configuration at the client application.

As another non-limiting example, for the "neither good nor bad" category, the embodiment allows the client application to connect with the resolved address, but perhaps through an opaque proxy server, and perhaps with a short TTL. An opaque proxy server is a proxy server configured to hide the address where client application is executing from the host at the resolved IP address.

As another non-limiting example for the "bad" category, the embodiment warns the client application, denies the client application connectivity with the resolved address, redirects the communication to another machine, or takes some other similarly purposed action.

In a cognitive or probabilistic method for selecting an action at the DNS server, the client application, or at another system in the network, the embodiment uses one or more confidence values. One embodiment assigns a confidence value to each weighted level of trustworthiness to indicate a level of confidence in selecting the level of trustworthiness, selecting the weight for the level of trustworthiness, or both. Another embodiment assigns a confidence value to the weighted score once the weighted score has been computed using (confidence rated or non-confidence rated) levels of trustworthiness. Generally, a decision based on more data, more accurate data, more recent data, or a combination thereof, tends to yield a higher confidence value as compared to a decision based on comparatively less data, comparatively less accurate data, comparatively less recent data, or a combination thereof, which tends to yield a comparatively lower confidence value.

An embodiment can be configured to use just the deterministic method. Another embodiment can be configured to use only the cognitive method. Another embodiment can be configured to use a combination of the deterministic and the cognitive methods.

A method of an embodiment described herein, when implemented to execute on a device or data processing system, comprises substantial advancement of the functionality of that device or data processing system in creating a trustworthiness-verifying DNS server for name resolution. For example, presently available DNS servers are unable to determine the trustworthiness of a host resolved address for allowing a client to communicate with the host. The presently available DNS servers can only exclude or include certain statically selected domain names and their corresponding hosts. An embodiment provides a method for enabling a DNS server to establish the trustworthiness of a host in real-time. An embodiment can evaluate the trustworthiness of even those hosts whose domain names and DNS records change in very short spans of time. An embodiment can use a deterministic method, a probabilistic method, or both, to select an action to perform once the trustworthiness of the host has been established using one or more measurements as described herein. This manner of creating a trustworthiness-verifying DNS server for name resolution is unavailable in the presently available methods. Thus, a substantial advancement of such devices or data processing systems by executing a method of an embodiment is in enabling a DNS server to actively and dynamically decide the trustworthiness, maliciousness, and similar characteristics of a host to improve the security of data communications with such host.

The illustrative embodiments are described with respect to certain domain names, addresses, hosts, records, information, levels of trustworthiness, weights, scores, thresholds, confidence values, actions, times, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
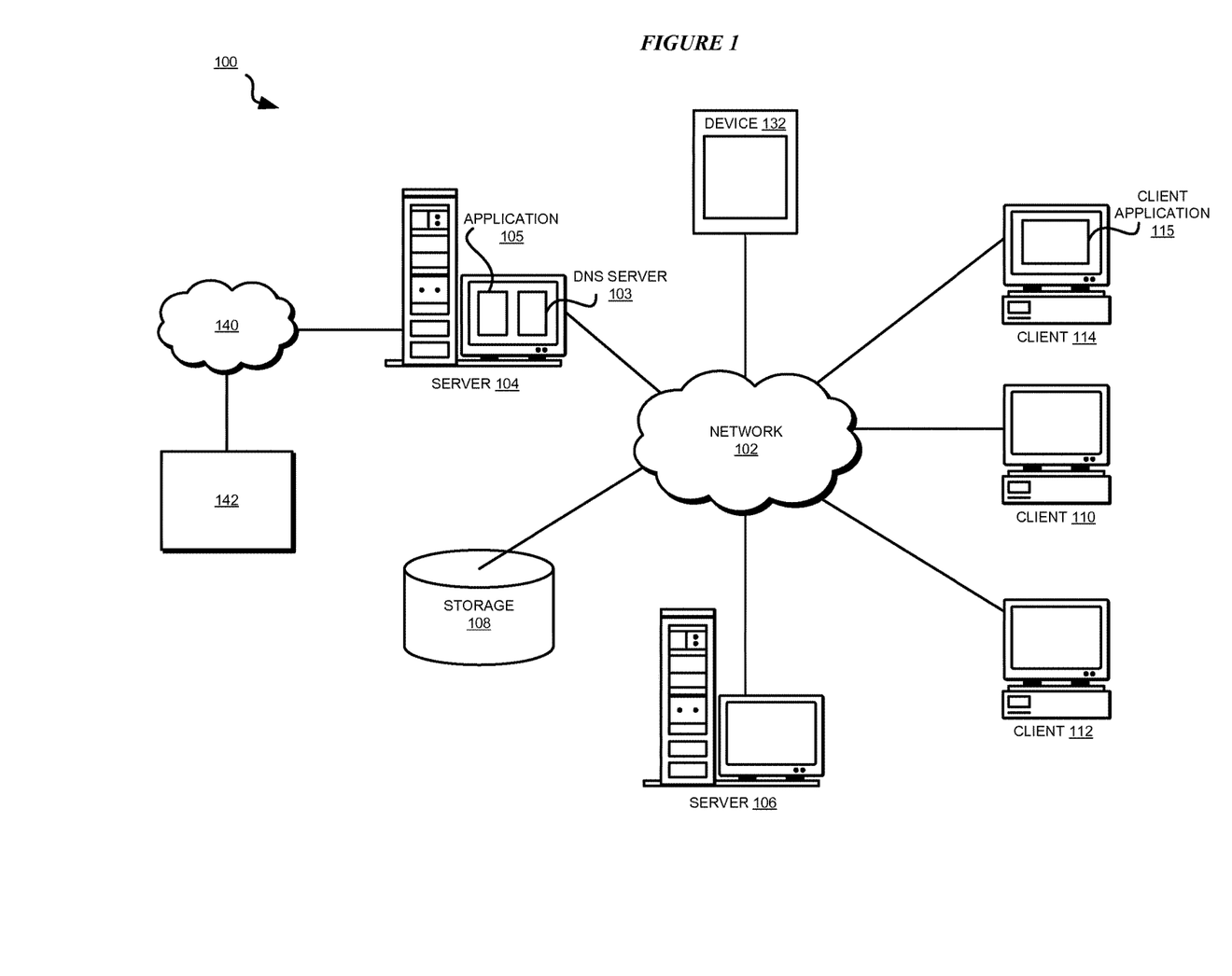
FIG. 1 depicts a block diagram of a network of data processing systems in which illustrative embodiments may be implemented.
Figure 2:
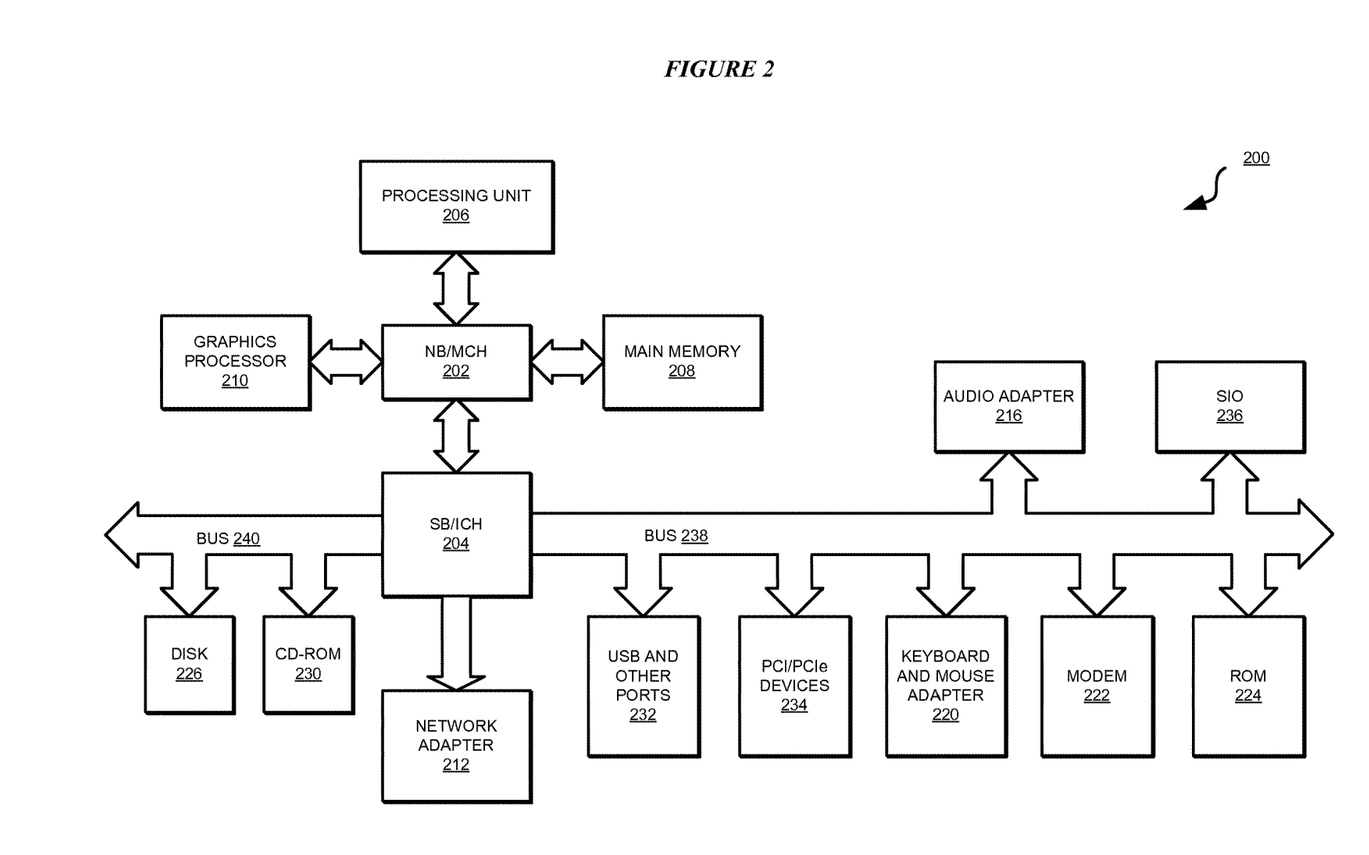
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

DNS server 103 is an LDNS on network 102. DNS sever 103 is modified by application 105, which implements an embodiment described herein. The combination of DNS server 103 and application 105 forms a modified LDNS to which name resolution requests are sent from client applications executing within network 102. Client application 115 is an example of such a client application and sends a name resolution request to resolve a domain name. The domain name resolves to an IP address of host 142. Host 142 is reachable over network 140, e.g., an extranet. As a non-limiting example, host 142 may be a malicious host and client application 115 may be malware that may be trying to call home to host 142 to perform a malicious activity in client 114 or network 102.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
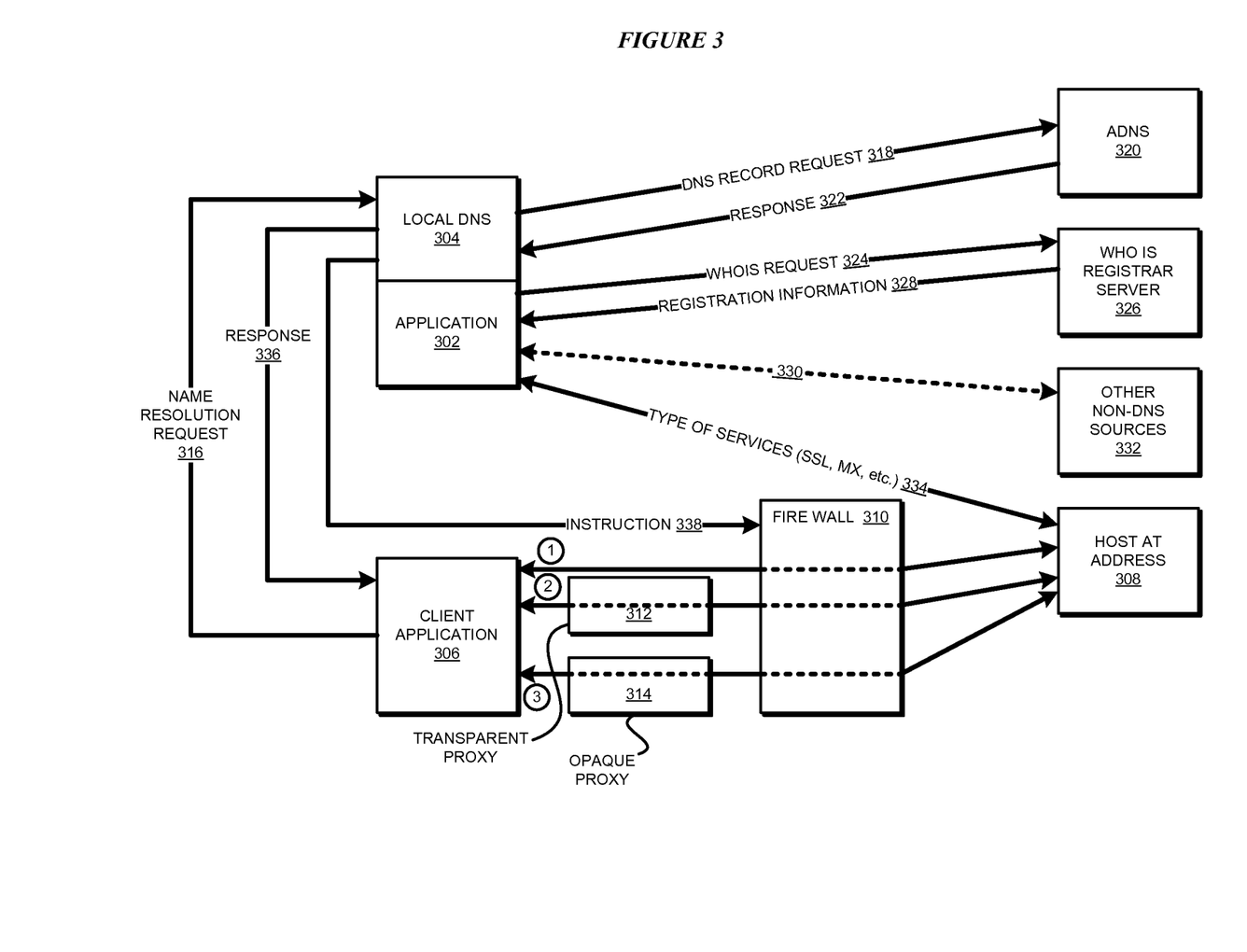
FIG. 3 depicts a block diagram of an example configuration for trustworthiness-verifying DNS server for name resolution in accordance with an illustrative embodiment.

With reference to FIG. 3, this figure depicts a block diagram of an example configuration for trustworthiness-verifying DNS server for name resolution in accordance with an illustrative embodiment. Application 302 is an example of application 105 in FIG. 1. LDNS 304 is an example of DNS server 103 in FIG. 1. Client application 306 is an example of client application 115 in FIG. 1. Host 308 is an example of host 142 in FIG. 1. Firewall 310, transparent proxy 312, and opaque proxy 314 are various components operating on network 102 in FIG. 1. In one non-limiting example, server 104 in FIG. 1 can be configured to operate as firewall 310.

Client application 306 sends name resolution request 316 to LDNS 304. LDNS 304 sends request 318 to ADNS 320 for the DNS record corresponding to the domain name in request 316. ADNS 320 returns response 322, which includes the DNS record of the domain name. Application 302 analyzes the DNS record in response 322 as described herein to determine one weighted level of trustworthiness for host 308.

Application 302 sends WHOIS request 324 to WHOIS registrar server 326. WHOIS server 326 sends registration information 328. Application 302 analyzes registration information 328 as described herein to determine another weighted level of trustworthiness for host 308.

Application 302 sends one or more requests 330 to the corresponding one or more non-DNS information sources 332. Application 302 analyzes the non-DNS information obtained from one or more source 332 as described herein to determine one or more other weighted levels of trustworthiness for host 308.

Application 302 sends one or more requests 334 to host 308. Application 302 analyzes the set of services found at host 308 in response to one or more requests 334, as described herein, to determine one or more additional weighted levels of trustworthiness for host 308.

Using the various weighted levels of trustworthiness in a deterministic manner, probabilistic manner, or both, application selects a category of actions. Depending on the category of actions selected, application 302 causes LDNS 304 to send response 336 to client application 306.

Under one circumstance, such as when host 308 is deemed benign, application 302 causes LDNS 304 to send the correct address of host 308 to client application 306. Application 302 further causes LDNS 304 to send instruction 338 to firewall 310 to allow communication to occur unobstructed between client application 306 and host 308, e.g., using path "1".

Under another circumstance, such as when host 308 is deemed benign, application 302 causes LDNS 304 to send the correct address of host 308 to client application 306 and cause transparent proxy 312 to allow communication to occur between client application 306 and host 308, e.g., using path "2".

Under another circumstance, such as when the trustworthiness of host 308 is questionable, application 302 causes LDNS 304 to send the correct address of host 308 to client application 306 and cause opaque proxy 314 to allow communication to occur between client application 306 and host 308 with additional security provisions, e.g., using path "3".

Under another circumstance, such as when host 308 is deemed malicious, application 302 causes LDNS 304 take other actions. For example, application 302 causes LDNS 304 to not send response 336, or send a predetermined address to client application 306. As another example, application 302 may cause LDNS 304 to send instruction 338 to firewall 310 to disallow communication to occur between client application 306 and host 308.

These examples of actions are not intended to be limiting. From this disclosure, those of ordinary skill in the art will be able to conceive many other actions and categories thereof, and the same are contemplated within the scope of the illustrative embodiments.

Figure 4:
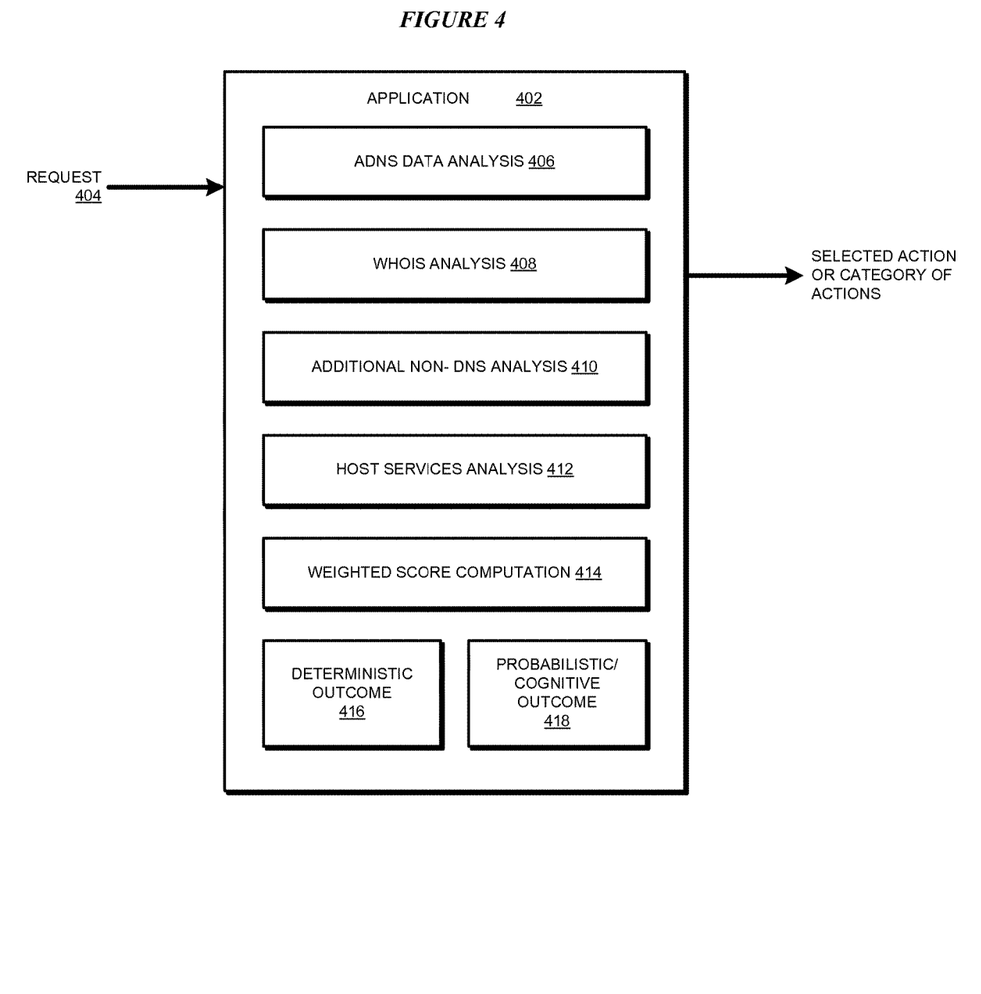
FIG. 4 depicts a block diagram of an example application for trustworthiness-verifying DNS server for name resolution in accordance with an illustrative embodiment.

With reference to FIG. 4, this figure depicts a block diagram of an example application for trustworthiness-verifying DNS server for name resolution in accordance with an illustrative embodiment. Application 402 is an example of application 302 in FIG. 3. Request 404 is an example of request 316 in FIG. 3.

Component 406 analyzes the DNS record received from the ADNS of the domain name in request 404. The analysis of the DNS record results in component 406 establishing a level of trustworthiness. In one embodiment, component 406 also applies a suitable weight configured in application 402 for the level of trustworthiness deriving from the ADNS data.

Component 408 analyzes the WHOIS data received in response to a WHOIS query on the domain name in request 404. The analysis of the WHOIS data results in component 408 establishing another level of trustworthiness. In one embodiment, component 408 also applies a suitable weight configured in application 402 for the level of trustworthiness deriving from the WHOIS data.

Component 410 analyzes the non-DNS data corresponding to the domain name in request 404. The analysis of the non-DNS data results in component 410 establishing another level of trustworthiness. In one embodiment, component 410 also applies a suitable weight configured in application 402 for the level of trustworthiness deriving from the non-DNS data.

Component 412 analyzes the services available at the host corresponding to the domain name in request 404. The analysis of the services results in component 412 establishing another level of trustworthiness. In one embodiment, component 412 also applies a suitable weight configured in application 402 for the level of trustworthiness deriving from the services at the host.

Component 414 uses one or more weighted levels of trustworthiness computed by components 406-412, to compute a weighted score. Component 416 uses the weighted score and one or more thresholds to produce a deterministic outcome, which identifies a category of actions to perform, as described herein. Component 418 uses one or more weighted or non-weighted levels of trustworthiness computed by components 406-412, the weighted score computed by component 414, or a combination thereof to produce a cognitive outcome. The cognitive outcome additionally uses one or more confidence values associated with the one or more weighted or non-weighted levels of trustworthiness, the weighted score, or a combination thereof, and identifies a category of actions to perform, as described herein.

Figure 5A:
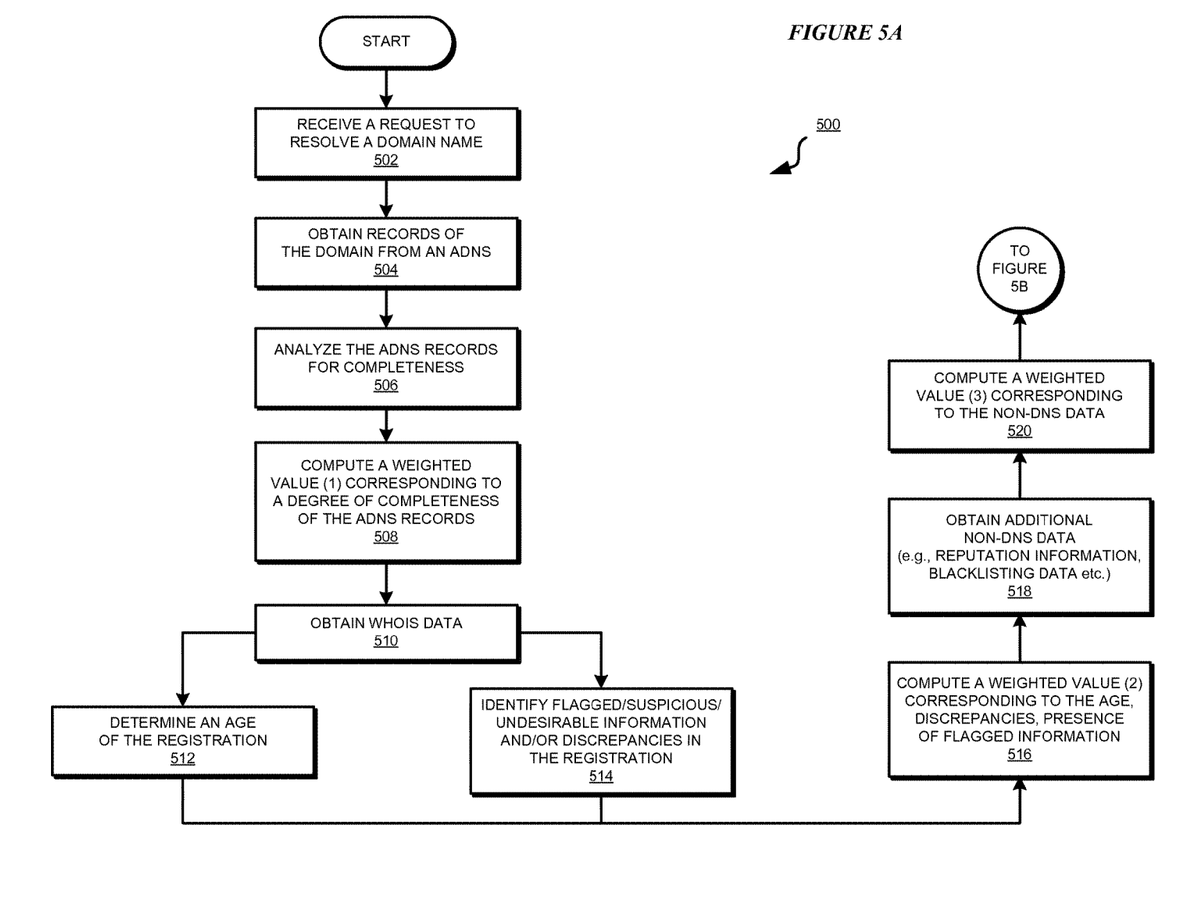
FIG. 5A depicts a flowchart of an example process for trustworthiness-verifying DNS server for name resolution in accordance with an illustrative embodiment.

With reference to FIG. 5A, this figure depicts a flowchart of an example process for trustworthiness-verifying DNS server for name resolution in accordance with an illustrative embodiment. Process 500 can be implemented in application 402 in FIG. 4. Process 500 has been divided into FIGS. 5A and 5B only for the clarity of the depiction and not to imply any break in the logic or flow.

The application receives or detects a request to resolve a domain name (block 502). The application obtains the records of the domain from the ADNS of the domain (block 504).

The application analyzes the ADNS records for completeness (block 506). The application computes a weighted value—value 1—corresponding to the degree of completeness of the ADNS records (block 508).

The application obtains the WHOIS data of the domain (block 510). The application performs blocks 512 and 514 together parallely, consecutively after one another in some order, or selectively in an either-or manner. For example, the application determines an age of the registration from the WHOIS data (block 512). The application identifies a flagged information and/or discrepancies in the registration information of the domain (block 514). The application computes one or more weighted value—value 2—corresponding to the age and/or flagged information in the WHOIS data (block 516).

The application may optionally obtain additional non-DNS data of one or more kind from one or more sources of such data (block 518). Responsive to obtaining non-DNS data, the application computes a weighted value—value 3—based on the non-DNS data, as described herein (block 520). Process 500 proceeds to FIG. 5B.

Figure 5B:
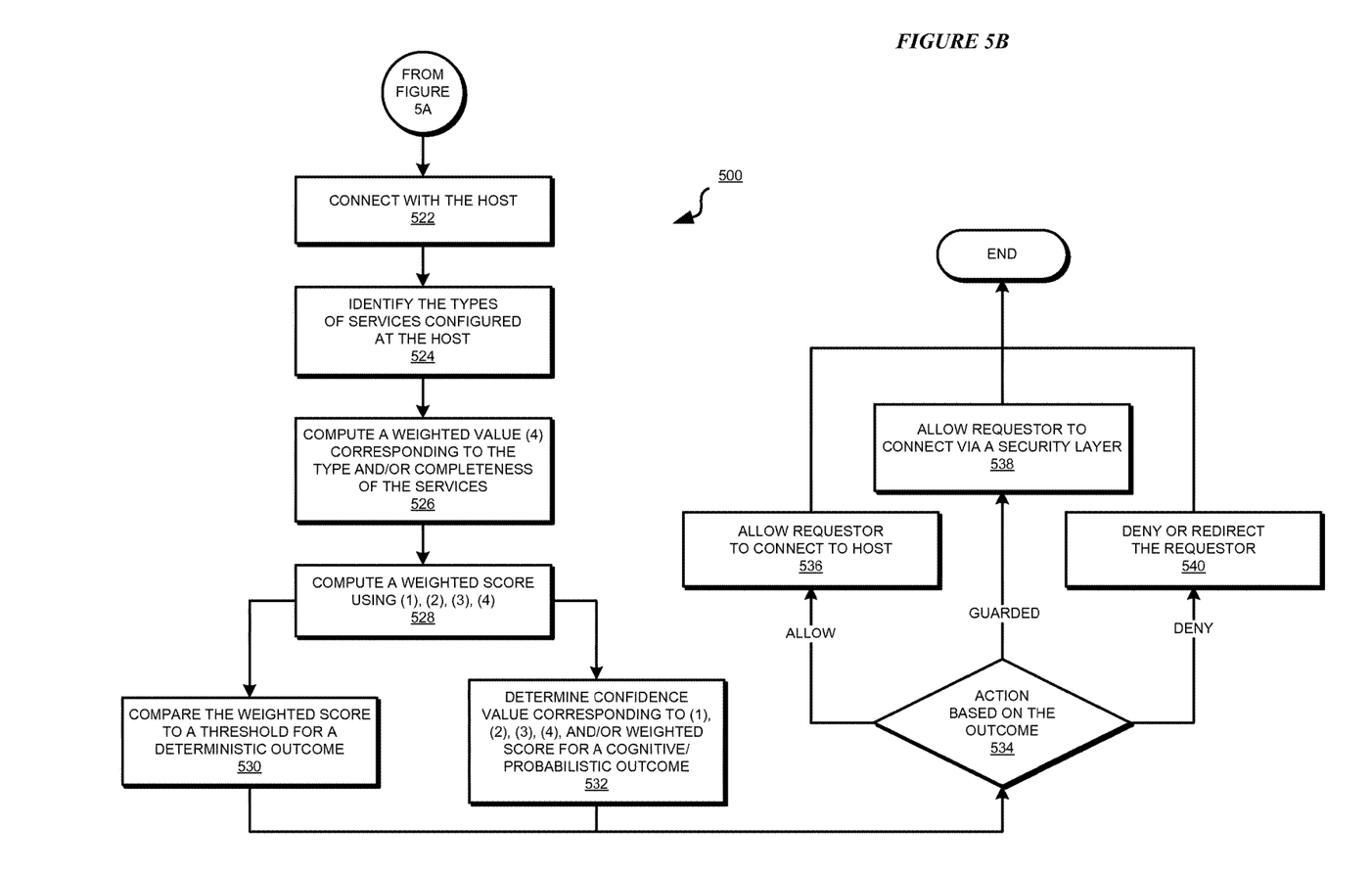
FIG. 5B depicts a continuation of process 500 from FIG. 5A.

With reference to FIG. 5B, this figure depicts a continuation of process 500 from FIG. 5A.

The application connects with the host to which the domain name of the request of block 502 resolves (block 522). The application identifies the types of services configured on the host (block 524). The application computes a weighted value—value 4—based on the types and/or the completeness of the services (block 526).

The application computes a weighted score using value 1, value 2, value 3, value 4, or some combination thereof (block 528). If using a deterministic method as described herein, the application compares the weighted score to a threshold in a set of thresholds to deterministically select a category of actions to perform in response to the request of block 502 (block 530). If using a cognitive method as described herein, the application determines a confidence value corresponding to value 1, value 2, value 3, value 4, the weighted score, or a combination thereof, to probabilistically select a category of actions to perform in response to the request of block 502 (block 532). The application can be configured to perform both blocks 530 and 532 without departing the scope of the illustrative embodiments.

The application determines an action to perform based on the outcome of block 530, 532, or both (block 534). As some non-limiting examples, the application may decide to allow the client application to communicate with the resolved host (block 536 via the "Allow" path of block 534); the application may decide to allow the client application to communicate with the resolved host in a guarded manner, such as using a security configuration (block 538 via the "Guarded" path of block 534); the application may decide to disallow or redirect the client application from communicating with the resolved host (block 540 via the "Deny" path of block 534). The application ends process 500 thereafter.

Thus, a computer implemented method, system or apparatus, and computer program product are provided in the illustrative embodiments for trustworthiness-verifying DNS server for name resolution. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   obtaining, responsive to receiving at a local domain name system server (LDNS) a request from a client application to resolve a domain name, a WHOIS information corresponding to the domain name;
   computing, based on the WHOIS information, using a processor at the LDNS, an age of registration of the domain name;
   computing a first weighted value based on the age;
   accessing, a host associated with the domain name to determine whether a type of a service is configured at the host;
   computing a second weighted value based on the configuration of the type of the service;
   obtaining a non-DNS information corresponding to the domain name;
   computing a reputation value of the domain name from the non-DNS information;
   computing a third weighted value based on the reputation value;
   obtaining a record corresponding to the domain name from an authoritative domain name server (ADNS), wherein the record includes a plurality of categories of DNS information;
   computing a degree of completeness of the record, wherein the degree of completeness is based upon the completeness of the plurality of categories of DNS information within the record;

computing a fourth weighted value based on the degree of
completeness of the record;
computing a weighted score using the first weighted
value, the second weighted value, the third weighted
value, and the fourth weighted value;
assigning the weighted score a confidence value;
selecting an action according to the weighted score and
the confidence value;
applying the action to a network component in a network
where the client application is executing, the applying
configuring the network component to control a manner
in which the client application communicates with the
host;
determining that the weighted score and confidence value
is indicative of an uncertainty in the host being malicious;
configuring, responsive to the uncertainty, and responsive
to the action, a proxy, wherein the network component
is the proxy, the configuring preventing the host from
learning an address associated with the client application;
communicating a correct address of the host to the client
application; and
configuring a TTL of the correct address below a threshold amount of time.

2. The method of claim 1, further comprising:
identifying that a data element in the WHOIS information
is incorrect; and
computing a fifth weighted value based on the incorrect
data element, wherein computing the weighted score
further uses the fifth weighted value.

3. The method of claim 1, further comprising:
comparing the weighted score to a threshold in a set of
thresholds, the comparing identifying a category of
actions, the category including the action.

4. The method of claim 1,
wherein the confidence value and the weighted score
together identify a category of actions, the category
including the action.

5. The method of claim 1, further comprising:
assigning a first confidence value to the first weighted
value; and
comparing the weighted score to a threshold in a set of
thresholds, the first confidence value and the comparing
together identifying a category of actions, the category
including the action.

6. The method of claim 1, further comprising:
assigning a first confidence value to the first weighted
value, the first confidence value identifying a category
of actions, the category including the action.

7. The method of claim 1, further comprising:
determining whether a certificate associated with the
service passes a trust test, wherein the service provides
connectivity to the host via secure sockets layer (SSL).

8. The method of claim 1, further comprising:
determining that the weighted score is indicative of the
host being malicious; and
configuring, responsive to the host being malicious, and
responsive to the action, a firewall, wherein the network component is the firewall, the configuring blocking a communication from the client application to the
host.

9. The method of claim 8, further comprising:
communicating a correct address of the host to the client
application; and
configuring a Time to Live (TTL) of the correct address
below a threshold amount of time.

10. The method of claim 1, wherein the method is
embodied in a computer program product comprising one or
more computer-readable storage devices and computer-readable program instructions which are stored on the one or
more computer-readable storage devices and executed by
one or more processors.

11. The method of claim 1, wherein the method is
embodied in a computer system comprising one or more
processors, one or more computer-readable memories, one
or more computer-readable storage devices and program
instructions which are stored on the one or more computer-readable storage devices for execution by the one or more
processors via the one or more memories and executed by
the one or more processors.

12. A computer program product comprising one or more
computer-readable storage devices, and program instructions stored on at least one of the one or more storage
devices, the stored program instructions comprising:
program instructions to obtain, responsive to receiving at
a local domain name system server (LDNS) a request
from a client application to resolve a domain name, a
WHOIS information corresponding to the domain
name;
program instructions to compute, based on the WHOIS
information, using a processor at the LDNS, an age of
registration of the domain name;
program instructions to compute a first weighted value
based on the age;
program instructions to access, a host associated with the
domain name to determine whether a type of a service
is configured at the host;
program instructions to compute a second weighted value
based on the configuration of the type of the service;
program instructions to obtain a non-DNS information
corresponding to the domain name;
program instructions to compute a reputation value of the
domain name from the non-DNS information;
program instructions to compute a third weighted value
based on the reputation value;
program instructions to obtain a record corresponding to
the domain name from an authoritative domain name
server (ADNS), wherein the record includes a plurality
of categories of DNS information;
program instructions to compute a degree of completeness
of the record, wherein the degree of completeness is
based upon the completeness of the plurality of categories of DNS information within the record;
program instructions to compute a fourth weighted value
based on the degree of completeness of the record;
program instructions to compute a weighted score using
the first weighted value, the second weighted value, the
third weighted value, and the fourth weighted value;
program instructions to assign the weighted score a confidence value;
program instructions to select an action according to the
weighted score and the confidence value;
program instructions to apply the action to a network
component in a network where the client application is
executing, the applying configuring the network component to control a manner in which the client application communicates with the host;
program instructions to determine that the weighted score
and confidence value is indicative of an uncertainty in
the host being malicious;
program instructions to configure, responsive to the
uncertainty, and responsive to the action, a proxy,
wherein the network component is the proxy, the configuring preventing the host from learning an address associated with the client application;

program instructions to communicate a correct address of the host to the client application; and program instructions to configure a TTL of the correct address below a threshold amount of time.

13. The computer program product of claim 12, further comprising:

program instructions to identify that a data element in the WHOIS information is incorrect; and program instructions to compute a fifth weighted value based on the incorrect data element, wherein computing the weighted score further uses the fifth weighted value.

14. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to obtain, responsive to receiving at a local domain name system server (LDNS) a request from a client application to resolve a domain name, a WHOIS information corresponding to the domain name;

program instructions to compute, based on the WHOIS information, using a processor at the LDNS, an age of registration of the domain name;

program instructions to compute a first weighted value based on the age;

program instructions to access, a host associated with the domain name to determine whether a type of a service is configured at the host;

program instructions to compute a second weighted value based on the configuration of the type of the service;

program instructions to obtain a non-DNS information corresponding to the domain name;

program instructions to compute a reputation value of the domain name from the non-DNS information;

program instructions to compute a third weighted value based on the reputation value;

program instructions to obtain a record corresponding to the domain name from an authoritative domain name server (ADNS), wherein the record includes a plurality of categories of DNS information;

program instructions to compute a degree of completeness of the record, wherein the degree of completeness is based upon the completeness of the plurality of categories of DNS information within the record;

program instructions to compute a fourth weighted value based on the degree of completeness of the record;

program instructions to compute a weighted score using the first weighted value, the second weighted value, the third weighted value, and the fourth weighted value;

program instructions to assign the weighted score a confidence value;

program instructions to select an action according to the weighted score and the confidence value;

program instructions to apply the action to a network component in a network where the client application is executing, the applying configuring the network component to control a manner in which the client application communicates with the host;

program instructions to determine that the weighted score and confidence value is indicative of an uncertainty in the host being malicious;

program instructions to configure, responsive to the uncertainty, and responsive to the action, a proxy, wherein the network component is the proxy, the configuring preventing the host from learning an address associated with the client application;

program instructions to communicate a correct address of the host to the client application; and program instructions to configure a TTL of the correct address below a threshold amount of time.

\* \* \* \* \*